(12) United States Patent
Marker et al.

(10) Patent No.: US 12,299,000 B2
(45) Date of Patent: May 13, 2025

(54) DATA RECONCILIATION SYSTEM AND METHOD

(71) Applicant: Bank of America Corporation, Charlotte, NC (US)

(72) Inventors: Richard William Marker, Waxhaw, NC (US); Amit Gupta, Piscataway, NJ (US); Kripsa Mahesh Mehta, Concord, NC (US); Selvakumar Albert, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 105 days.

(21) Appl. No.: 18/184,865

(22) Filed: Mar. 16, 2023

(65) Prior Publication Data

US 2024/0311393 A1    Sep. 19, 2024

(51) Int. Cl.
    *G06F 16/27* (2019.01)
(52) U.S. Cl.
    CPC .................. *G06F 16/273* (2019.01)
(58) Field of Classification Search
    CPC .................................................. G06F 16/273
    See application file for complete search history.

(56) References Cited

U.S. PATENT DOCUMENTS

| | | | |
|---|---|---|---|
| 7,640,273 B2 | 12/2009 | Wallmeier et al. | |
| 7,984,018 B2 | 7/2011 | Rodriguez et al. | |
| 9,449,115 B2 | 9/2016 | Hu et al. | |
| 10,182,083 B2 | 1/2019 | Cannon et al. | |
| 10,332,109 B2 | 6/2019 | Ghatage et al. | |
| 10,394,770 B2 | 8/2019 | Asher et al. | |
| 10,642,869 B2 | 5/2020 | Li et al. | |
| 10,943,196 B2 | 3/2021 | Li et al. | |
| 10,997,507 B2 | 5/2021 | Raamadhurai et al. | |
| 2006/0059088 A1 | 3/2006 | Krikorian et al. | |
| 2006/0129896 A1 | 6/2006 | Rohn | |
| 2009/0070237 A1 | 3/2009 | Lew et al. | |
| 2010/0205227 A1* | 8/2010 | Weissman | G06Q 10/063112 707/E17.032 |
| 2010/0245938 A1* | 9/2010 | Coley | G06F 16/93 707/E17.005 |
| 2011/0282687 A1 | 11/2011 | Koll | |
| 2014/0214450 A1 | 7/2014 | Bechtold et al. | |
| 2015/0310051 A1* | 10/2015 | An | G06F 16/951 707/738 |
| 2016/0365735 A1 | 12/2016 | Raczynski et al. | |
| 2017/0193031 A1 | 7/2017 | Papapanagiotou et al. | |
| 2021/0005081 A1 | 1/2021 | Schlesinger et al. | |

(Continued)

*Primary Examiner* — Syling Yen
*Assistant Examiner* — Kweku William Halm

(57) ABSTRACT

A system assigns a unique prefix to a data table. The system generates a set of document identifications (IDs) for a set of data records included in the data table. The system generates a data key that corresponds to a combination of two or more columns of the data table. The system identifies one or more data records that share a key value with each other, where the key value is associated with the data key. The system determines that the one or more data records belong to a user based at least on identifying that the one or more data records share the key value with each other. The system assigns an entity ID to the identified one or more data records in response to determining that the one or more data records belong to the user.

20 Claims, 3 Drawing Sheets

(56) References Cited

U.S. PATENT DOCUMENTS

| | | |
|---|---|---|
| 2021/0334292 A1 | 10/2021 | Burchard et al. |
| 2022/0012265 A1 | 1/2022 | Salame |
| 2022/0405836 A1 | 12/2022 | Gorman et al. |

* cited by examiner

DATA RECONCILIATION SYSTEM AND METHOD

TECHNICAL FIELD

The present disclosure relates generally to data processing and transformation, and more specifically to a data reconciliation system and method.

BACKGROUND

Different types of data sets may be provided to an organization. Some of the different types of data sets may include information about the same entities. The different data sets may be in different formats and inconsistent with each other. It is challenging to decipher and reconcile the inconsistent information that belongs to the same entity.

SUMMARY

The system described in the present disclosure is particularly integrated into practical applications of improving the data reconciliation technology, entity (e.g., user) verification and validation technology, and data verification and validation technology. Certain technical advantages are provided by the embodiments of the present disclosure.

In an example scenario, assume that multiple data sets (e.g., data tables) are received from multiple data sources. The data tables may include information (e.g., data records) about multiple entities or users. Each data table may be received from a different data source. For example, a first data table may be received from a first data source, and a second data table may be received from a second data source. The data tables may be in different data formats. For example, the data records in the first data table may be in a different data format compared to the data records in the second data table. In a particular example, a date-of-birth data record in the first data table may be in the format "mm-dd-yyyy", where the numbers of month, day, and year are indicated as mm, dd, and yyyy, respectively, whereas the date-of-birth data record in the second data table may be in the format "day-month-yyyy" where the month and the day are spelled out in a text form. Similarly, other data records that may be the same information and/or associated with the same user may be in a different format. This inconsistency among different data tables may reduce the accuracy in user verification and validation, and data verification and validation when comparing the data records from different data tables and determining if they correspond to each other or if they belong to the same user.

The disclosed system provides a solution to this and other technical problems by implementing an unconventional data reconciliation technique that is configured to identify corresponding data records across data tables, transform (e.g., reformat or translate) the corresponding data records into a unified or standardized format, identify which data record(s) belong to the same user, group the identified data record(s) across multiple data tables b together, and assign a unique entity ID to the grouped data record(s). The disclosed system is configured to perform similar operations in multiple iterations for each data key in each data table, where each data key is a different combination of two or more columns in a given data table. In this manner, the disclosed system improves the data reconciliation technology.

The disclosed system may use the information determined from the data reconciliation process to determine if there is an anomaly in an existing or an incoming data record. For example, if an incoming data record is added to a data table, the disclosed system may determine if the incoming data record is associated with an existing user. For example, if the incoming data record is associated with an anomalous action and/or does not correspond to the existing set of data records associated with the existing user, the disclosed system may determine that the incoming data record may be associated with a bad actor attempting to impersonate the user. In response, the disclosed system may perform one or more countermeasure actions to protect the user profile associated with the existing user. The countermeasure actions may include communicating an alert to the user, and suspending the profile of the user until the user verifies the profile, among others. In this way, the disclosed system improves the data security technology and the security of the user profile associated with the user. Therefore, the disclosed system minimizes (or prevents) unauthorized access to non-public information associated with the users. This leads to securing non-public information from unauthorized access by bad actors.

In certain embodiments, a system comprises a network interface operably coupled with a processor. The network interface is configured to receive a set of data tables, wherein each of the set of data tables comprises a different set of data compared to other data tables from among the set of data tables. The processor is configured to, for a first data table from among the set of data tables, assign a first unique prefix to the first data table. The first unique prefix differentiates the first data table from the other data tables. The first data table comprises a first set of data records. The processor is further configured to generate, based at least in part upon the first unique prefix, a first set of document identifications (IDs) for the first set of data records, wherein a document ID associated with a data record uniquely identifies the data record. The processor is further configured to generate a first data key that corresponds to a first combination of two or more columns of the first data table. The processor is further configured to identify, from among the first set of data records, one or more first data records that share a first key value with each other, wherein the first key value is associated with the first data key. The processor is further configured to determine that the one or more first data records belong to a first user based at least in part upon identifying that the one or more first data records share the first key value with each other. In response to determining that the one or more first data records belong to the first user, the processor is further configured to assign a first entity ID to the identified one or more first data records. The processor is further configured to generate a second data key that corresponds to a second combination of two or more columns of the first data table. The processor is further configured to identify, from among the first set of data records, one or more second data records that share a second key value with each other, wherein the second key value is associated with the first data key. The processor is further configured to determine that the one or more second data records belong to a second user based at least in part upon identifying that the one or more second data records share the second key value with each other. The processor is further configured to assign a second entity ID to the identified one or more second data records in response to determining that the one or more second data records belong to the second user.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
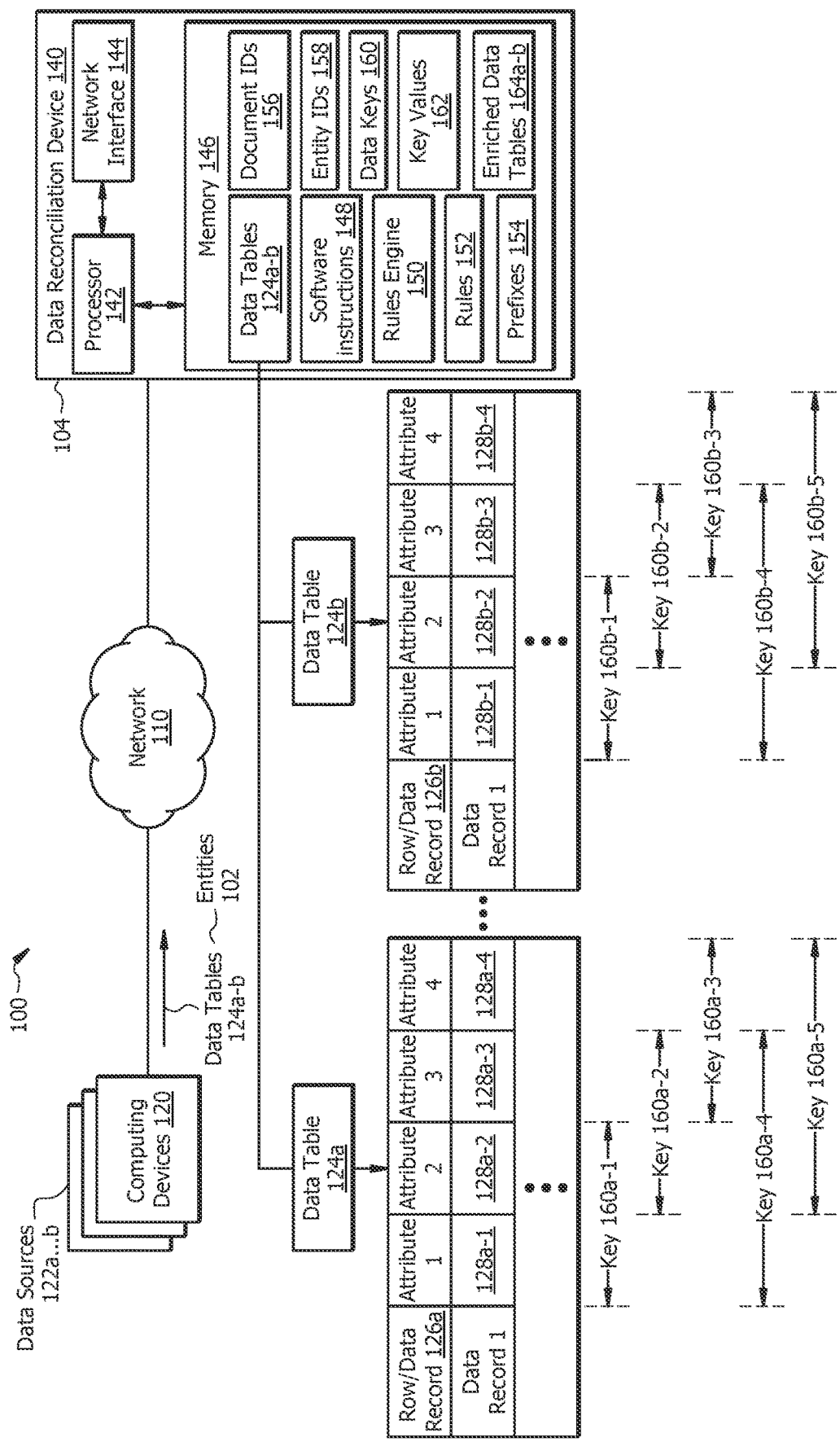
FIG. 1 illustrates an embodiment of a system configured to reconcile data records that belong to the same user.
Figure 2:
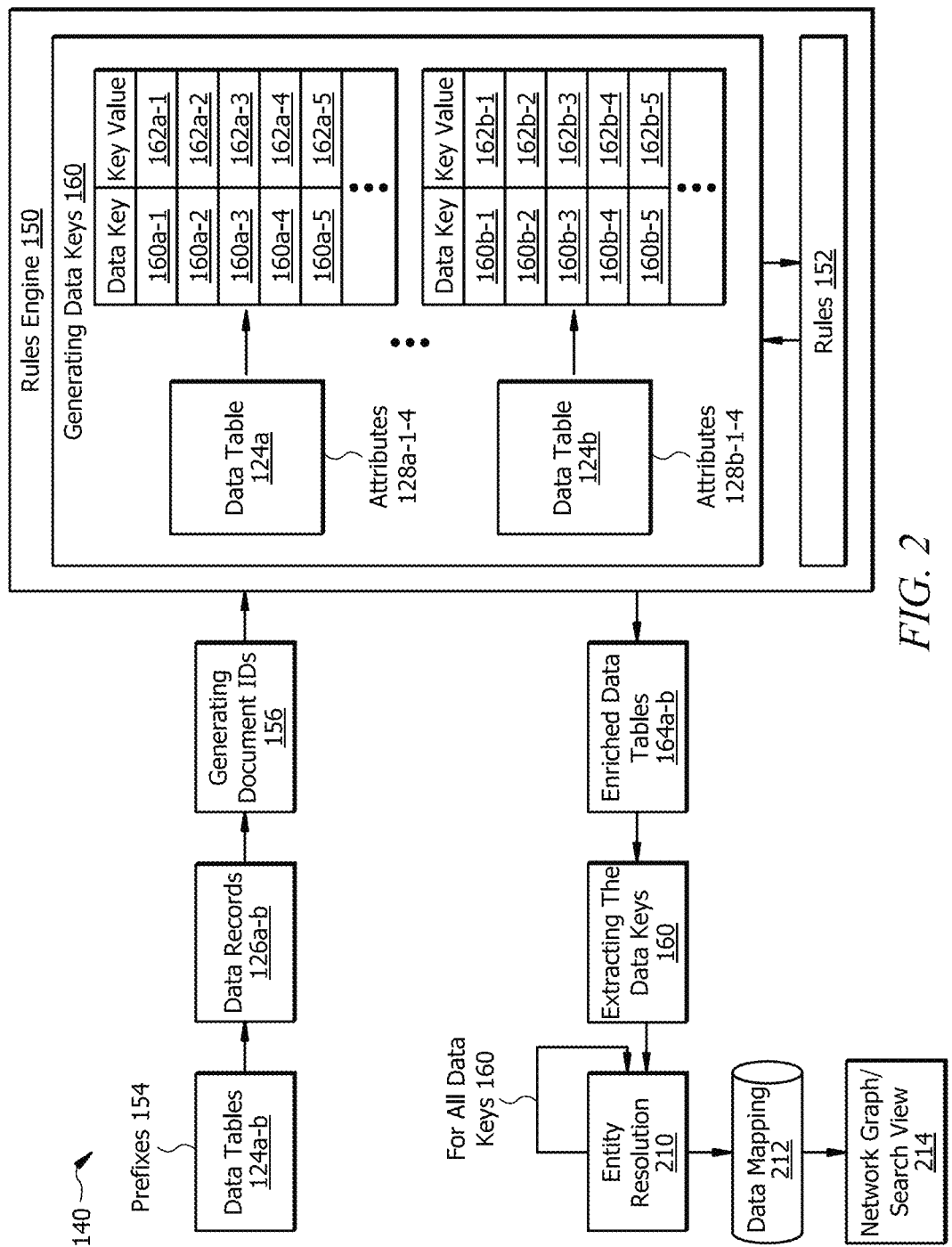
FIG. 2 illustrates an example operational flow of the system of FIG. 1.
Figure 3:
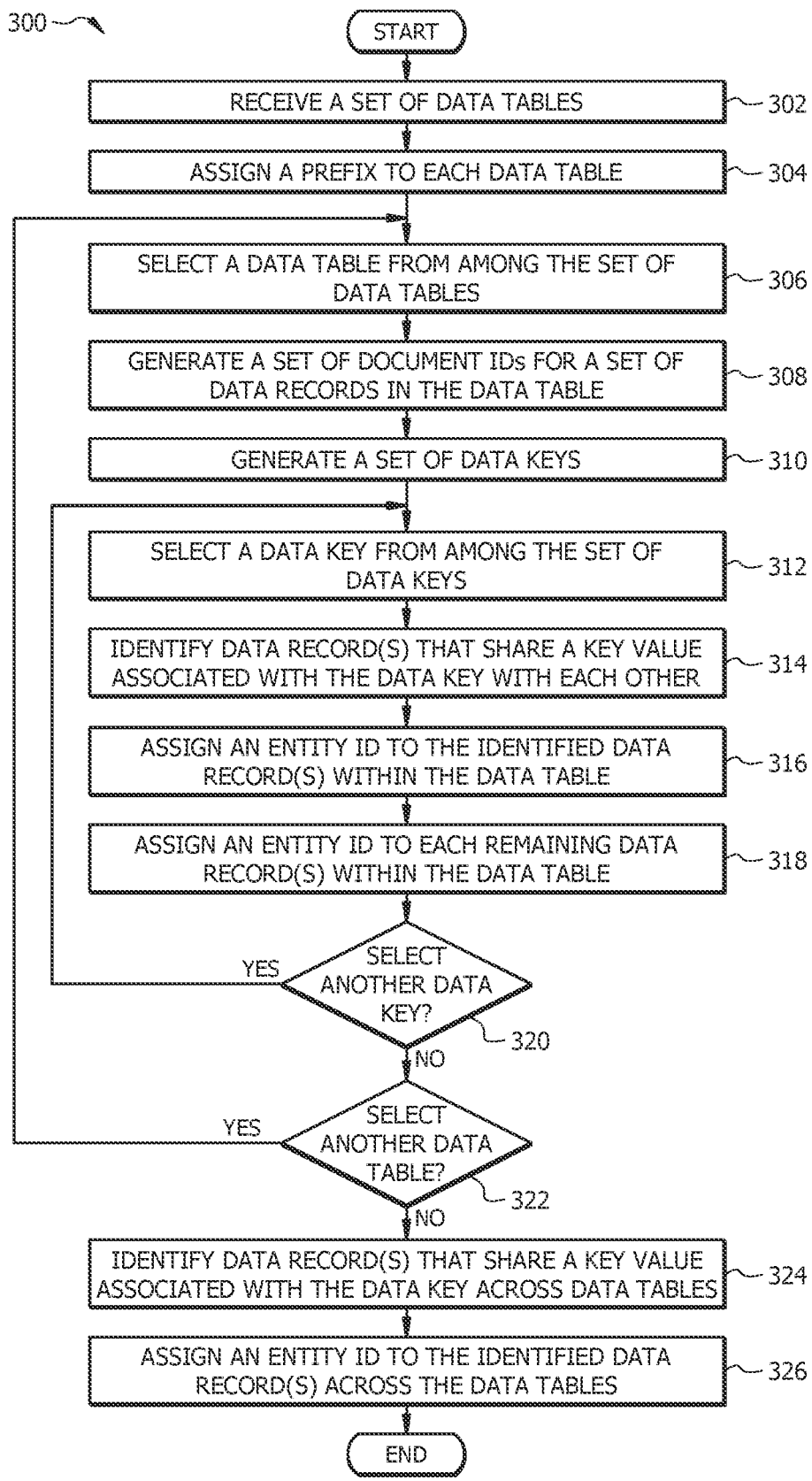
FIG. 3 illustrates an example flowchart of a method to reconcile data records that belong to the same user.

As described above, previous technologies fail to provide efficient and reliable solutions to reconcile data records that belong to the same user from data tables with inconsistent data records. Embodiments of the present disclosure and its advantages may be understood by referring to FIGS. 1 through 3. FIGS. 1 through 3 are used to describe systems and methods to reconcile data records that belong to the same user from data tables with inconsistent data records.

System Overview

FIG. 1 illustrates an embodiment of a system 100 that is generally configured to determine which set of data records 126a-b in one or more data tables 124a-b belong to the same entity 102 (e.g., user) and in response to determining that a particular set of data records 126a-b belong to the same entity 102, aggregate and reconcile the particular set of data records 126a-b with each other. In certain embodiments, the system 100 comprises a data reconciliation device 140 communicatively coupled with one or more computing devices 120 that are associated with one or more data sources 122 via a network 110. Network 110 enables communications among the components of the system 100. The data reconciliation device 140 may receive a set of data tables 124a-b from the computing devices 120. The data reconciliation device 140 may use the set of data tables 124a-b as input and perform one or more operations described herein. The data reconciliation device 140 comprises a processor 142 in signal communication with a memory 146. Memory 146 stores software instructions 148 that when executed by the processor 142 cause the processor 142 (and ultimately the data reconciliation device 140) to perform one or more operations described herein. In other embodiments, system 100 may not have all of the components listed and/or may have other elements instead of, or in addition to, those listed above.

In general, the system 100 improves the data reconciliation technology, entity (e.g., user) verification and validation technology, and data verification and validation technology. In an example scenario, assume that multiple data sets (e.g., data tables 124) are received from multiple data sources 122. The data tables 124 may include information (e.g., data records 126) about multiple entities or users 102. Each data table 124 may be received from a different data source 122. For example, a first data table 124a may be received from a first data source 122a, and a second data table 124b may be received from a second data source 122b. The data tables 124a-b may be in different data formats. For example, the data records 126a in the first data table 124a may be a different data format compared to the data records 126b in the second data table 124b. In a particular example, a date-of-birth data record 126a in the first data table 124a may be in the format "mm-dd-yyyy", where the numbers of month, day, and year are indicated as mm, dd, and yyyy, respectively, whereas the date-of-birth data record 126b in the second data table 124b may be in the format "day-month-yyyy" where the month and the day are spelled out in a text form. Similarly, other data records 126a-b that may be the same information and/or associated with the same user 102 may be in a different format. This inconsistency among different data tables 124 may reduce the accuracy in user verification and validation, and data verification and validation when comparing the data records 126a-b from different data tables 124a-b and determining if they correspond to each other or if they belong to the same user 102.

The system 100 provides a solution to this and other technical problems by implementing an unconventional data reconciliation technique that is configured to identify corresponding data records 126a-b across data tables 124a-b, transform (e.g., reformat or translate) the corresponding data records 126a-b into a unified or standardized format, identify which data record(s) 126a-b belong to the same user 102, group the identified data record(s) 126a-b across multiple data tables 124a-b together, and assign a unique entity ID 158 to the grouped data record(s) 126a-b. The system 100 is configured to perform similar operations in multiple iterations for each data key 160 in each data table 124a-b, where each data key 160 is a different combination of two or more columns in a given data table 124a-b. In this manner, the system 100 improves the data reconciliation technology.

The system 100 may use the information determined from the data reconciliation process to determine if there is an anomaly in an existing or an incoming data record 126. For example, if an incoming data record 126 is added to a data table 124, the system 100 may determine if the incoming data record 126 is associated with an existing user 102. For example, if the incoming data record 126 is associated with an anomalous action and/or does not correspond to the existing set of data records 126 associated with the existing user 102, the system 100 may determine that the incoming data record 126 may be associated with a bad actor attempting to impersonate the user 102. In response, the system 100 may perform one or more countermeasure actions to protect the user profile associated with the existing user 102. The countermeasure actions may include communicating an alert to the user 102, and suspending the profile of the user 102 until the user 102 verifies the profile, among others. In this way, the system 100 improves the data security technology and the security of the user profile associated with the user 102.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users. Examples of the computing device 120 include but are not limited to, a personal computer, a desktop computer, a workstation, a server, a laptop, a tablet computer, a mobile phone (such as a smartphone), a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by users. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. For example, the computing device 120 may communicate a data table 124 to the data reconciliation device 140 via the network 110 in response to a command from the user, e.g., when the user initiates the transmission of the data table 124 to the data reconciliation device 140.

Each computing device 120 may be associated with a different data source 122. A data source 122 may be an organization. The data sources 122 may include internal and external data sources 122 with respect to the organization 104 to which the data reconciliation device 140 belongs. For example, the first data table 124*a* may be associated with an internal data source 122, and the second data table 124*b* may be associated with an external data source 122. This may be one of the reasons why the data records 126 in the data tables 124*a-b* may be inconsistent with each other and have different formats. Each row in a data table 124*a-b* may be referred to as a data record 126*a-b*.

Data Reconciliation Device

Data reconciliation device 140 generally includes a hardware computer system configured to process the data tables 124*a-b*, identify which data record(s) 126*a-b* belong to (e.g., associated with) the same user 102, assign a unique entity ID 158 to those data record(s) 126*a-b* that belong to the same user 102, assign a unique entity ID 158 to each of the remaining data record(s) 126*a-b* that have not been assigned an entity ID 158, and perform multiple iterations of each data key 160 in each data table 124*a-b* until no data key 160 is left for evaluation.

In certain embodiments, the data reconciliation device 140 may be implemented by a cluster of computing devices, such as virtual machines. For example, the data reconciliation device 140 may be implemented by a plurality of computing devices using distributed computing and/or cloud computing systems in a network. In certain embodiments, the data reconciliation device 140 may be configured to provide services and resources (e.g., data and/or hardware resources, such as the enriched data tables 164*a-b*, network graph (314 in FIG. 3), etc.) to other components and devices.

The data reconciliation device 140 comprises a processor 142 operably coupled with a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the data reconciliation device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 as described in FIG. 2, and one or more operations of method 300 as described in FIG. 3.

Network interface 144 is configured to enable wired and/or wireless communications. The network interface 144 may be configured to communicate data between the data reconciliation device 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, a cloud database, a network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, data tables 124*a-b*, rules engine 150, rules 152, prefixes 154, document IDs 156, entity IDs 158, data keys 160, key values 162, enriched data tables 164a-b, and/or any other data or instructions. The software instructions 148 may comprise any suitable set of instructions, logic, rules, or code operable to execute the processor 142 and perform the functions described herein, such as some or all of those described in FIGS. 1-3.

Rules engine 150 may be implemented by the processor 142 executing the software instructions 148, and is generally configured to transform (e.g., translate) each data record 126a-b to a respective uniform or standardized format or schema based on a set of rules 152. The set of rules 152 may indicate how each data record 126a-b should be transformed. The set of rules 152 may include different sets of rules 152 for each attribute 128 associated with each data record 126a-b (e.g., attributes 128a-1 to 128a-4 and 128b-1 to 128b-4). Examples of the attributes 128 may include a name, a number (e.g., social security number, an identifying number, a phone number, etc.), a residential address, a work address, and a date of birth, among others. As mentioned above, when the data tables 124 are received at the data reconciliation device 140, the data records 126a-b may be inconsistent with each other. Therefore, the data tables 124a-b may be fed to the rules engine 150 so the data records 126a-b are reformatted or translated according to the set of rules 152. Examples of rules 152 are described further below.

In certain embodiments, prefixes 154 may be numbers assigned to the data tables 124a-b. Each data table 124a-b may be assigned a unique prefix 154. For example, the data table 124a may be assigned (or pre-configured) with a first prefix 500, and the data tables 124b may be assigned (or pre-configured) with a second prefix 600. In certain embodiments, each document ID 156 may be a unique number assigned to a respective data record 126a-b. Each document ID 156 may be used to uniquely identify a respective data record 126a-b.

In certain embodiments, each entity ID 158 may be a unique number assigned to a group of data record(s) 126a-b that are determined to be associated with (e.g., belong to) the same user 102. The data reconciliation device 140 may generate each entity ID 158 by implementing a random number generator.

In certain embodiments, each data key 160 (e.g., each data 160a-1 to 160a-5 and 160b-1 to 160b-5) may be a unique combination of one or more (or two or more) columns (or attributes 128) of a data table 124a-b, respectively. Each data table 124a-b may include any suitable number of data keys 160. Although only two data tables 124a-b are shown in FIG. 1, it is understood that the operations of the present disclosure may be applied to any number of data tables 124.

The attributes 128 in each data table 124a-b may be different from the attributes 128 in another data table 124a-b. Therefore, a different set of data keys 160 may be generated for different data tables 124a-b. Although only four attributes 128 are shown in FIG. 1, it is understood that each data tables 124a-b may include any number of columns representing attributes 128.

Each key value 162 may include the content (e.g., value, text, and string) associated with a respective data key 160. Each key value 162 may be associated with a respective data key 160 and a respective data record 126a-b. Each enriched data table 164a-b is a data table that includes the formatted or translated data records 126a-b of an original raw data table 124a-b, respectively. For example, after the data records 126a-b are translated into a respective standardized format, they are populated into a respective enriched data table 164a-b.

Operational Flow

FIG. 2 illustrates an example operational flow 200 of the system 100 for identifying which data record(s) 126a-b belong to the same user 102 and grouping the data record(s) 126a-b that belong to the same user 102 with a unique entity ID 158 within and across data tables 124a-b. The operational flow 200 may begin when the data tables 124a-b are received at the data reconciliation device 140.

In operation, the data reconciliation device 140 assigns a unique prefix 154 to each data tale 124a-b, similar to that described in FIG. 1. Each prefix 154 may differentiate a respective data table 124 from other data tables 124.

Generating Document IDs

The data reconciliation device 140 may generate a unique document ID 156 for each data record 126a-b in each data table 124a-b based at least on the respective prefix 154. In this process, in certain embodiments, the data reconciliation device 140 may generate a document ID 156 by setting a row number on column(s) that are unique in the data table 124a-b and by tagging the document ID 156 with the respective prefix 154 of the data table 124a-b.

In certain embodiments, each document ID 156 for a respective data record 126a-b may be generated by concatenating the respective unique prefix 154 to a data key value 162 associated with a respective data key 160 (or the respective data record 126a-b). Each document ID 156 associated with a data record 126 may uniquely identify the data record 126. In a particular example, a document ID 156 of a data table 124 may be generated by the following concatenation function: concat (700, row_number over(order by aml_pty_id)), where the aml_pty_id represents a column that has a unique value for each data record 126 of the data table 124, and 700 is a prefix 154 value of the data table 124.

In an embodiment where a data table 124a-b does not include a column with unique identifiers for each data record 126, a hash function (e.g., md5, secured hash algorithm (SHA) 256, and the like) may be used to generate a unique document ID 156 for each data record 126. In this manner, the data reconciliation device 140 may generate a set of document IDs 156 for the data records 126a-b of each data table 124a-b. For example, the data reconciliation device 140 may generate a first document ID 156 for a first data record 126 in a first data table 124a, and generate a second document ID 156 for a second data record 126 in the first data table 124a. The data reconciliation device 140 may perform a similar operation to generate document IDs 156 for the data records 126 of other data tables 124b.

Generating Data Keys

The data reconciliation device 140 may generate one or more data keys 160 for each data tables 124a-b. In this process, the data reconciliation device 140 may generate each data key 160 by combining two or more columns (e.g., two or more attributes 128a-b) of a data table 124a-b, respectively. For example, for the first data table 124a, the data reconciliation device 140 may generate a first data key 160a-1 that corresponds to a first combination of two or more columns of the first data table 124a. Similarly, the data reconciliation device 140 may generate data keys 160a-2 to 5, where each of the data keys 160a-2 to 5 corresponds to a different combination of two or more columns of the data table 124a. In one example, the first data key 160a-1 may correspond to a first combination of a name and a number associated with the users 102 indicated in data table 124a, and the second data key 160a-2 may correspond to a second combination of a name and a residential address associated with the users 102 indicated in the data table 124a. The data reconciliation device 140 may perform a similar operation to generate the data keys 160*b*-1 to 160*b*-5 for the second data table 124*b*, where each of the data keys 160*b*-1 to 160*b*-5 corresponds to a different combination of two or more columns of the data tables 124*b*.

As discussed in FIG. 1, each data table 124*a-b* may include different attributes 128. Therefore, the data keys 160 for each data table 124*a-b* may be different compared to data keys 160 generated for other data tables 124*a-b*. Each data key 160 may be associated with a respective key value 162, similar to that described in FIG. 1. A key value 162 may include the content in the combination of the row(s) of column(s) that was used to generate the respective key value 160.

Transforming the Data Records into a Unified Format

The data reconciliation device 140 may feed the output of the data key generation process to the rules engine 150 to identify the inconsistencies among the data records 126 and transform the corresponding data records 126 into a unified format. In this process, the rules engine 150 may use the set of rules 152, similar to that described in FIG. 1.

Each data key 160 may be associated with a different set of rules 152. A function name for each data key 160 may indicate the inconsistency in the data key 160 or the respective key value 162. Examples of the rules 152 for each key type (i.e., data keys 160) along with respective function names are presented in the table 1.

TABLE 1

Examples of the rules 152 for different data keys 160

| key_type (data key 160) | function name | Rules 152 |
|---|---|---|
| fullname~address | invalidNameAsBlank | if name has no Alphabet then it is considered as Invalid |
| | | if length of address is less than 10 then consider as invalid |
| | | if postal code in address has any alphabets the consider as invalid |
| | | if country code field in address has any of following strings then consider 1st 6 digits of postal code only in address key derivation: |
| | | US |
| | | USA |
| | | UNITED STATES |
| | | UNITED STATES OF AMERICA |
| fullname~dob | replaceinvalidDateAsBlank | if name has no Alphabet then it is considered as Invalid |
| | | if age is <0 and age > 120 consider the DOB as Invalid |
| fullname~email | replaceinvalidMailAsBlank | if length of email is less than 1 then consider as invalid |
| | | if email has occurrence of '@' more than 1 time then consider as invalid |
| | | if no occurrence of '@' in email then consider as invalid |
| | | if there is empty before the occurrence of '@' then consider as invalid |
| | | if there is empty after the occurrence of '@' then consider as invalid |
| | | if the following strings are occurred before @ in email then considered as invalid: |
| | | NO |
| | | NONE |
| | | NOEMAIL |
| | | NOONE |
| | | NOEN |
| | | NO |
| | | N/A |
| | | DECLINE |
| | | if email has occurrence of any of the strings above after '@' then consider the email key as invalid |
| fullname~partialaddr | | if name has no alphabet then it is considered as Invalid |
| fullname~partialaddr1 | | if name has no alphabet then it is considered as Invalid |
| fullname~partialaddr2 | | if name has no alphabet then it is considered as Invalid |
| fullname~phone | replaceinvalidPhoneAsBlank | if phone number has other than 0-9 then replace that occurrence string with blank |
| | | if length of phone number is less than 4 then consider as invalid |
| | | if same digit in the number is repeated >= 6 times then consider the phone number as invalid |

TABLE 1-continued

Examples of the rules 152 for different data keys 160

| key_type (data key 160) | function name | Rules 152 |
|---|---|---|
| name~acc5partkey | invalidNameAsBlank | if name has no alphabet then it is considered as Invalid<br>remove leading zeros on accno<br>Remove leading and trailing spaces on name<br>replace spaces within accno with blank |
| name~no1 | invalidNameAsBlankpopulateNo | if name has no alphabet then it is considered as Invalid<br>remove leading zeros on number<br>Remove leading and trailing spaces on name<br>replace spaces within number with blank |
| name~no2 | replaceinvalidSsnAsBlank | if length of social security number is not 9 digits i.e. 0 to 9 then consider as invalid<br>The following number values are considered as invalid<br>000000002<br>000000004<br>000000398<br>SPDATAOOTAX<br>999999991<br>Z4497339<br>111111111<br>999999999<br>000000000<br>222222222<br>if same digit in the number is repeated >= 8 times then consider the number as invalid<br>if name has no alphabet then it is considered as Invalid |
| pty_id | invalidNameAsBlank | if name has no alphabet then it is considered as Invalid |

These example rules 152 are exemplary and not meant to limit the scope of the present disclosure. By applying the rules 152, the data reconciliation device 140 (e.g., via the rules engine 150) may determine which data records 126 (or which data keys 160) are valid and can be used for further analysis of identifying which data records 126 belong to the same user 102.

In certain embodiments, the data reconciliation device 140 may determine a confidence score for each data key 160, where the confidence score may indicate a degree of confidence that the data key 160 is valid or not. For example, the confidence score for a data key 160 may be in a scale of 0 to 10, where 0 represents that the data key 160 is not valid, and 10 represents that the data key 160 is 100% valid.

In certain embodiments, the data reconciliation device 140 may use the data keys 160 that are associated with confidence scores more than a threshold (e.g., more than 7 out of 10) for further analysis and disregard the other data keys 160. In certain embodiments, the data reconciliation device 140 may determine a key strength factor for each key value 162, where the key strength factor may represent the uniqueness of the key value 162 across the data records 126. In certain embodiments, the data reconciliation device 140 may use the key strength factor to determine which data keys 160 to be used for the data reconciliation process 210. The data reconciliation device 140 may generate the enriched data tables 164a-b by populating the determined data keys 160 and respective key values 162 in the enriched data tables 164a-b.

Entity Resolution

The data reconciliation device 140 may identify data records 126 (associated with key values 162) with different document IDs 156 that belong to the same user 102. This process may be referred to as an entity resolution or data reconciliation process 210. In this process, the data reconciliation device 140 may first evaluate the first data table 124a with respect to the first data key 160. Then, the data reconciliation device 140 may evaluate the first data table 124a with respect to the second data key 160. The data reconciliation device 140 may evaluate the first data table 124a with respect to each data key 160 one at a time in multiple iterations. When the process of evaluating the first data table 124a is completed, the data reconciliation device 140 may analyze the second data table 124b with respect to each data key 160 one at a time in multiple iterations by comparing the result of the analysis of the first data table 124a with the second data table 124b. The data reconciliation device 140 may repeat a similar operation per data table 124 and per data key 160 until all possible iterations are performed.

In the analysis of the first data table 124a with respect to the first data key 126, the data reconciliation device 140 may compare each key value 162 with other key values 162 that are associated with the first data key 160 in the first data table 124a. The data reconciliation device 140 may identify a group of key values 162 that have the same content. In response, the data reconciliation device 140 may determine that the data records 126 associated with the identified group of key values 162 belong to the same user 102. In other words, the data reconciliation device 140 may determine that a set of data records 126 belong to a first user 102 based on identifying that the set of data records 126 share the first key value 162 with each other. In response, the data reconciliation device 140 may assign a unique entity ID 158 to the identified set of data records 126 and ultimately to the set of key values 162. An example of this process is shown in table 2.

TABLE 2

Example entity ID assignment to data records with common key values in one data table.

| Row | Entity ID158 | Document ID156 | data key 160 | Key value 162 | Data table |
|---|---|---|---|---|---|
| 1 | 900725228815 | 70078535583 | name~ssn | ZAN~651676855 | 124a |
| 2 | 900725228815 | 70073455575 | name~ssn | ZAN~651676855 | 124a |

For example, as can be seen in table 2, assume that the data reconciliation device 140 has determined that the rows 1 and 2 in the data tab 124a are associated with key values 162 "ZAN~651676855", where the key values 162 have the same content as each other. In response, the data reconciliation device 140 may determine that these data records 126 in rows 1 and 2 belong to the same user 102 and therefore, assign the same entity ID 158 to these data records 126, similar to that shown in table 2. The data reconciliation device 140 may perform a similar operation in multiple iterations to identify and group other data records 126 that share a common key value 162 (associated with the first data key 160) in data table 124a.

In certain embodiments, when the analysis with respect to the first data key 160 is completed, the remaining data records 126 that have not been grouped or assigned to an entity ID 158 may go through another iteration based on a second data key 160. For example, the data reconciliation device 140 may identify a second set of data records 126 that share a second key value 162 (associated with the second data key 160) with each other. In response, the data reconciliation device 140 may determine that the second set of data records 126 belongs to a second user 102. The data reconciliation device 140 may assign a second entity ID 158 to the second set of data records 126 (and ultimately to the identified data values 162). In a similar manner, the data reconciliation device 140 may perform similar operations in other iterations for other data keys 160 in the first data table 124. In certain embodiments, when the analysis with respect to the data keys 160 is completed, the data reconciliation device 140 may assign different entity IDs 158 to unresolved data records 126 that have not yet been assigned an entity ID 158.

When the analysis of the first data table 124a is completed, the data reconciliation device 140 may process the second data table 124b. In this process, the data reconciliation device 140 may compare the result from processing the first data table 124a with the second data table 124b. For example, in the first iteration for the second data table 124b, the data reconciliation device 140 may compare the key values 162 of the first data key 160 (that was first used in the first iteration of identifying data records 126 that share the first key value 162 associated with the first data key 160 in the first data table 124b) that are associated with the data records 126 in the second data table 124b.

In other words, the data reconciliation device 140 may take the key value 162 of the same key type (e.g., data key 160) of other data tables 124 one at a time and search to find a matching content with the content of the key value 162, similar to that shown in table 3.

TABLE 3

Example entity ID assignment to data records with common key values across data tables.

| Row | Entity ID158 | Document ID156 | data key 160 | Key value 162 | Data table |
|---|---|---|---|---|---|
| 1 | 90038674742 | 600214057 | name~ssn | GITE~336165322 | 124b |
| 2 | 90038674742 | 70050851745 | name~ssn | GITE~336165322 | 124a |

As can be seen from the example of table 3, the data records 126 in row 1 of data table 124b and row 2 of the data table 124a share a common key value 162 associated with the first data key 160. Therefore, they are assigned the same entity ID 158.

The data reconciliation device 140 may perform a similar operation for each of other data keys 160 across data tables 124a-b to identify which data records 126a-b share a key value 162 associated with any data key 160. In response, the data reconciliation device 140 may group and assign a unique entity ID 158 to each set of identified data records 126a-b.

In certain embodiments, the data reconciliation device 140 may compare the resolved data records 126 (i.e., data records 126 that have been assigned an entity ID 158) with the unresolved data records 126 (i.e., data records 126 that have not been assigned an entity ID 158). The data reconciliation device 140 may determine if an unresolved data record 126 shares at least one key value 162 with any of the resolved data records 126. If it is determined that an unresolved data record 126 shares at least one key value 162 with a particular resolved data record 126, the data reconciliation device 140 may assign the same entity ID 158 that is assigned to the particular resolved data record 126 to the unresolved data record 126. The data reconciliation device 140 may perform a similar operation for each unresolved data record 126.

In certain embodiments, the data reconciliation device 140 may assign new entity IDs 158 to unresolved data record(s) 126 that have not been assigned an entity ID 158 after evaluating all the data records 126 with respect to all the data keys 160 across the data tables 124a-b. In certain embodiments, the data records 126 associated with the same document ID 156 may be assigned the same entity ID 158.

In certain embodiments, the data reconciliation device 140 may implement a fuzzy logic by the processor 142 (see FIG. 1) executing software instructions 148 (see FIG. 1) to define a threshold similarity score among the data records 126 associated with the same data key 160. For example, assume that a first data record 126 is associated with a first key value 162, and a second data record 126 is associated with a second key value 162, where the key values 162 are associated with a particular data key 160. If it is determined that more than a threshold percentage (e.g., 90%, 95%, etc.) of characters in the first key value 162 corresponds to counterpart characters in the second key value 162, the data reconciliation device 140 may determine that the first and second data records 126 belong to the same user 102 and assign the same entity ID 158 to them.

In certain embodiments, the data reconciliation device 140 may implement text processing, a neural network, a machine learning algorithm, and the like to perform one or more operations described herein.

In data mapping 212, the data reconciliation device 140 may determine the mapping between and among the different sets of data records 126a-b that are assigned with corresponding entity ID 158. The data reconciliation device 140 may generate a network graph 214 or search view that represents a visual mapping between the data records 126a-b. An operator may view the network graph 214 and provide feedback on the performance of the data reconciliation device 140. For example, the operator may confirm, update, or override the determination of the data reconciliation device 140. The feedback of the operator may be used as a training dataset to improve the accuracy of the performance of the data reconciliation device 140 in identifying the data records 126 that belong to the same user 102, e.g., in a supervised or semi-supervised machine learning algorithm.

The data reconciliation device 140 may use the information determined from the data reconciliation process 210 to determine if there is an anomaly in an existing or an incoming data record 126. For example, if an incoming data record 126 is added to a data table 124, the data reconciliation device 140 may determine if the incoming data record 126 is associated with an existing user 102. For example, if the incoming data record 126 is associated with an anomalous action and/or does not correspond to the existing set of data records 126 associated with the existing user 102, the data reconciliation device 140 may determine that the incoming data record 126 may be associated with a bad actor attempting to impersonate the user 102. In response, the data reconciliation device 140 may perform one or more countermeasure actions to protect the user profile associated with the existing user 102. The countermeasure actions may include communicating an alert to the user 102, and suspending the profile of the user 102 until the user 102 verifies the profile, among others. In this way, the data reconciliation device 140 improves the data security technology and the security of the user profile associated with the user 102.

Method for Data Reconciliation

FIG. 3 illustrates an example flowchart of a method 300 for the data reconciliation process according to certain embodiments of the present disclosure. Modifications, additions, or omissions may be made to method 300. Method 300 may include more, fewer, or other operations. For example, operations may be performed in parallel or in any suitable order. While at times discussed as the system 100, data reconciliation device 140, or components of any of thereof performing operations, any suitable system or components of the system may perform one or more operations of the method 300. For example, one or more operations of method 300 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 302-326.

At operation 302, the data reconciliation device 140 receives a set of data tables 124a-b, similar to that described in FIGS. 1 and 2. At operation 304, the data reconciliation device 140 assigns a prefix 154 to each data table 124a-b. Each prefix 154 may uniquely identify a respective data table 124a-b.

At operation 306, the data reconciliation device 140 selects a data table 124 from among the set of data tables 124a-b. The data reconciliation device 140 may iteratively select a data table 124 until no data table 124 is left for evaluation. At operation 308, the data reconciliation device 140 generates a set of document IDs 156 for the set of data records 126 in the data table 124. Examples of generating the set of document IDs 156 are described in FIGS. 1 and 2. Each document ID 156 may be a numerical value that uniquely represents a data record 126.

At operation 310, the data reconciliation device 140 generates a set of data keys 160. The set of data keys 160 may be a different combination of two or more columns (e.g., attributes 128) of the data table 124, similar to that described in FIGS. 1 and 2.

At operation 312, the data reconciliation device 140 selects a data key 160 from among the set of data keys 160. The data reconciliation device 140 may iteratively select a data key 160 until no data key 160 is left for evaluation. In certain embodiments, the data reconciliation device 140 may select a data key 160 that is the most diverse across the data records 124 for the first iteration of the analysis, e.g., has the most variety of key values 162 across the data records 126. In certain embodiments, the data reconciliation device 140 may select a data key 160 that is the most unique across the data records 124 for the first iteration of the analysis, e.g., has the least variety of key values 162 across the data records 126.

At operation 314, the data reconciliation device 140 identifies data record(s) 126 that share the key value 162 associated with the data key 160 with each other. For example, the data reconciliation device 140 may compare the key value 160 associated with the data key 160 in each row/data record 126 with other key values 160 associated with the data key 160, similar to that described in FIGS. 1 and 2.

At operation 316, the data reconciliation device 140 assigns an entity ID 158 to the identified data record(s) 126 within the selected data table 124. Each entity ID 158 may be a numerical value that uniquely represents a respective user 102. The data reconciliation device 140 may also determine that the identified data record(s) 126 belong to the same user 102.

At operation 318, the data reconciliation device 140 assigns an entity ID 158 to each remaining data record(s) 126 within the data table 124. The remaining data records 126 may be unsolved data records 126 that have not been assigned to an entity ID 158 yet.

At operation 320, the data reconciliation device 140 determines whether to select another data key 160. The data reconciliation device 140 may determine to select another data key 124 if at least one data key 160 is left for evaluation. If the data reconciliation device 140 determines to select another data key 124, method 300 may return to operation 312.

At operation 322, the data reconciliation device 140 determines whether to select another data table 124. The data reconciliation device 140 determines to select another data table 124 if at least one data table 124 is left for evaluation. If the data reconciliation device 140 determines to select another data table 124, method 300 may return to operation 306. Otherwise, the method 300 may proceed to operation 324.

At operation 324, the data reconciliation device 140 identifies data record(s) 126 that share a key value 162 associated with a data key 160 (one data key 160 at a time) with each other across data tables 124a-b, similar to that described in FIG. 2.

At operation 326, the data reconciliation device 140 assigns an entity ID 158 to the identified record(s) 126 across the data tables 124a-b. In this process, the data reconciliation device 140 may compare the result of the entity ID assignment operation performed on the first data table 124a with a second data table 124b to identify the common key values 162 across the data tables 124a-b. The data reconciliation device 140 may assign the same entity ID 158 that was assigned to a data record 126 in the first data table 124a to data record(s) 126 (in the second data table 124b) that share the common key value 162 with the data record 126 from the first data table 124a. The data reconciliation device 140 may perform these operations in loops and multiple operations for each data key 160 and each data table 124.

In certain embodiments, the data reconciliation device 140 may identify a third data record 126 in the first data table 124a that is not associated with any of the key values 162. In response, the data reconciliation device 140 may determine that the third data record 126 is not associated with any of the existing assigned users 102 to the other data records 126. In response, the data reconciliation device 140 may assign a third entity ID 158 to the third data record 126.

In certain embodiments, with respect to the second data table 124b, the data reconciliation device 140 may identify a fourth data record 126 that is associated with a third key value 160 (associated with a third data key 160). The data reconciliation device 140 may compare the third key value 162 to the first key value 162 to which the first data record 126 (in the first or second data table 124) is previously assigned to the first user 102. If the data reconciliation device 140 determines that the first key value 162 corresponds to the third key value 152, the data reconciliation device 140 may determine that the fourth data record 126 belongs to the first user 102. The data reconciliation device 140 may assign the same entity 158 as the first user 102 to the fourth data record 126.

In certain embodiments, the data reconciliation device 140 may receive an incoming data record 126 added to the first data table 124. The data reconciliation device 140 may determine whether the incoming data record 126 is associated with a first key value 162. If it is determined that the incoming data record 126 is associated with the first key value 1262, the data reconciliation device 140 may determine that the incoming data record 126 belongs to the first user 102 that is previously determined to whom the first key value 162 belongs. The data reconciliation device 140 may assign the same entity ID 158 to the incoming data record 126.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a network interface configured to receive a set of data tables, wherein each of the set of data tables comprises a different set of data compared to other data tables from among the set of data tables;
   a processor operably coupled with the network interface, and configured to:
   for a first data table from among the set of data tables:
   assign a first unique prefix to the first data table, wherein:
   the first unique prefix differentiates the first data table from the other data tables; and
   the first data table comprises a first set of data records;
   generate, based at least in part upon the first unique prefix, a first set of document identifications (IDs) for the first set of data records, wherein a document ID associated with a data record uniquely identifies the data record;
   generate a first data key that corresponds to a first combination of two or more attributes indicated in respective columns of the first data table, wherein each of the two or more attributes indicates a different user information, wherein the first data key is distinct from the first unique prefix;
   identify, from among the first set of data records, one or more first data records that share a first key value with each other, wherein the first key value is associated with the first data key;
   determine that the one or more first data records belong to a first user based at least in part upon identifying that the one or more first data records share the first key value with each other;
   in response to determining that the one or more first data records belong to the first user, assign a first entity ID to the identified one or more first data records;
   generate a second data key that corresponds to a second combination of two or more attributes indicated in respective columns of the first data table wherein each of the two or more attributes indicates a different user information, wherein the first data key is distinct from the second data key;

identify, from among the first set of data records, one or more second data records that share a second key value with each other, wherein the second key value is associated with the first data key;

determine that the one or more second data records belong to a second user based at least in part upon identifying that the one or more second data records share the second key value with each other; and in response to determining that the one or more second data records belong to the second user, assign a second entity ID to the identified one or more second data records.

2. The system of claim 1, wherein the processor is further configured to:

identify, from among the first set of data records, a third data record that is not associated with the first key value or the second key value;

determine that the third data record is not associated with the first user or the second user based at least in part upon identifying that the third data record is not associated with the first key value or the second key value; and assign a third entity ID to the third data record.

3. The system of claim 1, wherein the processor is further configured to:

for a second data table from among the set of data tables:
assign a second unique prefix to the second data table, wherein:
the second unique prefix differentiates the second data table from the other data tables; and
the second data table comprises a second set of data records;
generate, based at least in part upon the second unique prefix, a second set of document IDs for the second set of data records;
generate a third data key that corresponds to a third combination of two or more columns of the second data table;
identify, from among the second set of data records, a fourth data record that is associated with a third key value, wherein the third key value is associated with the third data key;
compare the first key value with the third key value;
determine that the first key value y corresponds to the third key value;
in response to determining the first key value corresponds to the third key value:
determine that the fourth data record belongs to the first user; and
assign the first entity ID to the fourth data record.

4. The system of claim 1, wherein:
the first data key corresponds to a first combination of a name and a number associated with users; and
the second data key corresponds to a second combination of the name and a residential address associated with the users.

5. The system of claim 1, wherein the processor is further configured to:
receive an incoming data record added to the first data table;
determine that the incoming data record is associated with the first key value;
in response to determining that the incoming data record is associated with the first key value:
determine that the incoming data record belongs to the first user; and
assign the first entity ID to the incoming data record.

6. The system of claim 1, wherein generating the set of document IDs for the first set of data records comprises:
generating a first document ID for a first data record from among the first set of data records; and
generating a second document ID for a second data record from among the first set of data records.

7. The system of claim 6, wherein:
generating the first document ID comprises concatenating the first unique prefix with a first data value associated with the first data record; and
generating the second document ID comprises concatenating the first unique prefix with a second data value associated with the second data record.

8. A method comprising:
receiving a set of data tables, wherein each of the set of data tables comprises a different set of data compared to other data tables from among the set of data tables;
for a first data table from among the set of data tables:
assigning a first unique prefix to the first data table, wherein:
the first unique prefix differentiates the first data table from the other data tables; and
the first data table comprises a first set of data records;
generating, based at least in part upon the first unique prefix, a first set of document identifications (IDs) for the first set of data records, wherein a document ID associated with a data record uniquely identifies the data record;
generating a first data key that corresponds to a first combination of two or more attributes indicated in respective columns of the first data table, wherein each of the two or more attributes indicates a different user information, wherein the first data key is distinct from the first unique prefix;
identifying, from among the first set of data records, one or more first data records that share a first key value with each other, wherein the first key value is associated with the first data key;
determining that the one or more first data records belong to a first user based at least in part upon identifying that the one or more first data records share the first key value with each other;
in response to determining that the one or more first data records belong to the first user, assigning a first entity ID to the identified one or more first data records;
generating a second data key that corresponds to a second combination of two or more attributes indicated in respective columns of the first data table wherein each of the two or more attributes indicates a different user information, wherein the first data key is distinct from the second data key;
identifying, from among the first set of data records, one or more second data records that share a second key value with each other, wherein the second key value is associated with the first data key;
determining that the one or more second data records belong to a second user based at least in part upon identifying that the one or more second data records share the second key value with each other; and in response to determining that the one or more second data records belong to the second user, assigning a second entity ID to the identified one or more second data records.

9. The method of claim 8, further comprising:
identifying, from among the first set of data records, a third data record that is not associated with the first key value or the second key value;
determining that the third data record is not associated with the first user or the second user based at least in part upon identifying that the third data record is not associated with the first key value or the second key value; and
assigning a third entity ID to the third data record.

10. The method of claim 8, further comprising:
for a second data table from among the set of data tables:
assigning a second unique prefix to the second data table, wherein:
the second unique prefix differentiates the second data table from the other data tables; and
the second data table comprises a second set of data records;
generating, based at least in part upon the second unique prefix, a second set of document IDs for the second set of data records;
generating a third data key that corresponds to a third combination of two or more columns of the second data table;
identifying, from among the second set of data records, a fourth data record that is associated with a third key value, wherein the third key value is associated with the third data key;
comparing the first key value with the third key value;
determining that the first key value y corresponds to the third key value;
in response to determining the first key value corresponds to the third key value;
determining that the fourth data record belongs to the first user; and
assigning the first entity ID to the fourth data record.

11. The method of claim 8, wherein:
the first data key corresponds to a first combination of a name and a number associated with users; and
the second data key corresponds to a second combination of the name and a residential address associated with the users.

12. The method of claim 8, further comprising:
receiving an incoming data record added to the first data table;
determining that the incoming data record is associated with the first key value;
in response to determining that the incoming data record is associated with the first key value:
determining that the incoming data record belongs to the first user; and
assigning the first entity ID to the incoming data record.

13. The method of claim 8, wherein generating the set of document IDs for the first set of data records comprises:
generating a first document ID for a first data record from among the first set of data records; and
generating a second document ID for a second data record from among the first set of data records.

14. The method of claim 13, wherein:
generating the first document ID comprises concatenating the first unique prefix with a first data value associated with the first data record; and
generating the second document ID comprises concatenating the first unique prefix with a second data value associated with the second data record.

15. A non-transitory computer-readable medium storing instructions that when executed by a processor, cause the processor to:
receive a set of data tables, wherein each of the set of data tables comprises a different set of data compared to other data tables from among the set of data tables;
for a first data table from among the set of data tables:
assign a first unique prefix to the first data table, wherein:
the first unique prefix differentiates the first data table from the other data tables; and
the first data table comprises a first set of data records;
generate, based at least in part upon the first unique prefix, a first set of document identifications (IDs) for the first set of data records, wherein a document ID associated with a data record uniquely identifies the data record;
generate a first data key that corresponds to a first combination of two or more attributes indicated in respective columns of the first data table, wherein each of the two or more attributes indicates a different user information, wherein the first data key is distinct from the first unique prefix;
identify, from among the first set of data records, one or more first data records that share a first key value with each other, wherein the first key value is associated with the first data key;
determine that the one or more first data records belong to a first user based at least in part upon identifying that the one or more first data records share the first key value with each other;
in response to determining that the one or more first data records belong to the first user, assign a first entity ID to the identified one or more first data records;
generate a second data key that corresponds to a second combination of two or more attributes indicated in respective columns of the first data table wherein each of the two or more attributes indicates a different user information, wherein the first data key is distinct from the second data key;
identify, from among the first set of data records, one or more second data records that share a second key value with each other, wherein the second key value is associated with the first data key;
determine that the one or more second data records belong to a second user based at least in part upon identifying that the one or more second data records share the second key value with each other; and
in response to determining that the one or more second data records belong to the second user, assign a second entity ID to the identified one or more second data records.

16. The non-transitory computer-readable medium of claim 15, wherein the instructions further cause the processor to:
identify, from among the first set of data records, a third data record that is not associated with the first key value or the second key value;
determine that the third data record is not associated with the first user or the second user based at least in part upon identifying that the third data record is not associated with the first key value or the second key value; and assign a third entity ID to the third data record.

17. The non-transitory computer-readable medium of claim 15, wherein the instructions further cause the processor to:

for a second data table from among the set of data tables:

assign a second unique prefix to the second data table, wherein:

the second unique prefix differentiates the second data table from the other data tables; and the second data table comprises a second set of data records;

generate, based at least in part upon the second unique prefix, a second set of document IDs for the second set of data records;

generate a third data key that corresponds to a third combination of two or more columns of the second data table;

identify, from among the second set of data records, a fourth data record that is associated with a third key value, wherein the third key value is associated with the third data key;

compare the first key value with the third key value;

determine that the first key value y corresponds to the third key value;

in response to determining the first key value corresponds to the third key value:

determine that the fourth data record belongs to the first user; and assign the first entity ID to the fourth data record.

18. The non-transitory computer-readable medium of claim 15, wherein:

the first data key corresponds to a first combination of a name and a number associated with users; and the second data key corresponds to a second combination of the name and a residential address associated with the users.

19. The non-transitory computer-readable medium of claim 15, wherein the instructions further cause the processor to:

receive an incoming data record added to the first data table;

determine that the incoming data record is associated with the first key value;

in response to determining that the incoming data record is associated with the first key value;

determine that the incoming data record belongs to the first user; and assign the first entity ID to the incoming data record.

20. The non-transitory computer-readable medium of claim 15, wherein generating the set of document IDs for the first set of data records comprises:

generating a first document ID for a first data record from among the first set of data records; and generating a second document ID for a second data record from among the first set of data records.

* * * * *